US007928968B2

(12) United States Patent
Shon et al.

(10) Patent No.: US 7,928,968 B2
(45) Date of Patent: Apr. 19, 2011

(54) APPARATUS FOR DISPLAYING ADVERTISEMENT IMAGE

(75) Inventors: Heung Soo Shon, Goyang-si (KR); Tae Kwang Kim, Seoul (KR); Chang Keun Lee, Seoul (KR); Hyun Sang Cho, Gwangmyeong-si (KR)

(73) Assignee: Art Ware Co., Ltd. (KR)

( * ) Notice: Subject to any disclaimer, the term of this patent is extended or adjusted under 35 U.S.C. 154(b) by 1011 days.

(21) Appl. No.: 11/801,508

(22) Filed: May 10, 2007

(65) Prior Publication Data

US 2008/0030519 A1 Feb. 7, 2008

(30) Foreign Application Priority Data

Aug. 7, 2006 (KR) ........................ 10-2006-0074043
Aug. 31, 2006 (KR) ........................ 10-2006-0083199

(51) Int. Cl.
*G06F 3/038* (2006.01)

(52) U.S. Cl. ........................................ 345/204; 345/205

(58) Field of Classification Search ............ 345/1.1–1.3, 345/2.1–2.3, 204, 82; 40/606, 610; 340/815.83
See application file for complete search history.

(56) References Cited

U.S. PATENT DOCUMENTS

| | | | | |
|---|---|---|---|---|
| 5,410,328 | A * | 4/1995 | Yoksza et al. | 345/82 |
| 6,069,595 | A * | 5/2000 | Tokimoto | 345/44 |
| 6,362,801 | B1 * | 3/2002 | Yuhara | 345/82 |
| 6,737,983 | B1 * | 5/2004 | Temple | 340/815.45 |
| 7,064,673 | B1 * | 6/2006 | Bonham | 340/815.4 |
| 7,071,620 | B2 * | 7/2006 | Devos et al. | 313/512 |
| 7,102,601 | B2 * | 9/2006 | Devos et al. | 345/82 |
| 2005/0052373 | A1 * | 3/2005 | Devos et al. | 345/82 |
| 2005/0052374 | A1 * | 3/2005 | Devos et al. | 345/82 |
| 2008/0225143 | A1 * | 9/2008 | Joffer et al. | 348/280 |

* cited by examiner

*Primary Examiner* — Nitin Patel
(74) *Attorney, Agent, or Firm* — Baker Hostetler LLP

(57) ABSTRACT

An apparatus for displaying an advertisement image having a plurality of image elements includes a display panel for displaying the advertisement image thereon. The display panel includes a plurality of clusters which are serially connected with one another and are arranged in a pattern same as that of the advertisement image. Each of the clusters has at least one LED cell corresponding to one image element in the advertisement image, respectively, and a driving unit for driving the LED cell to represent the corresponding image element on the LED cell. An image editor performs an editing of the advertisement image by way of changing color and/or brightness of the respective image elements cells. And a control module controls the driving of the clusters in synchronization with an editing period for the advertisement image.

7 Claims, 4 Drawing Sheets

APPARATUS FOR DISPLAYING ADVERTISEMENT IMAGE

FIELD OF THE INVENTION

The present invention relates to a display apparatus for advertisement, and more specifically, to an apparatus for displaying an advertisement image, while allowing a free editing of the advertisement image.

BACKGROUND OF THE INVENTION

In recent years, advertisement, propaganda and news contents have been expressed on a display panel with numerals, letters or symbols so as to deliver intended means to users. Such a display panel may be constructed of monochrome or color LEDs (Light Emitting Diodes) uniformly arranged thereon to display an advertisement image in monochrome or full color.

FIG. 1 shows a typical display apparatus for advertisement which displays advertisement having various kinds of numerals, letters or symbols. As shown in FIG. 1, the display apparatus includes a display panel 10 having a number of LEDs 11 uniformly arranged on a front side thereof; a case 30 to support the display panel 10; a sun screen 20 of lattice type coupled with a dielectric resin on the front surface of the case 30 to prevent light from being projected on the LEDs 11; and a driver 40 disposed in the back of the case 30 to control operations of the LEDs 11.

In the display apparatus as described above, advertisement are produced on the LEDs, for example, in a form of an image, and the advertisement image, in most cases, have a limited number of fixed frames, i.e., a single or a few frames. Accordingly, since the advertisement image having at most a single or a few frames are represented on the display panel 10, a viewer feels monotonous to see the advertisement image, thereby decreasing effectiveness of such advertisement. Further, the advertisement image produced in this manner does not permit a free editing so that it is not possible to make various changes to the advertisement image.

In addition, the display apparatus represents the advertisement image only linearly, which is one of many characteristics of LEDs. Since light from the LEDs 11 has a high linearity at an angle, as shown in FIG. 2, when viewing the display panel from a side, it is impossible to easily identify the advertisement image represented on the display panel 10.

SUMMARY OF THE INVENTION

It is, therefore, an object of the present invention to provide an apparatus for displaying an advertisement image while allowing a free editing of the advertisement image, thereby giving an activity and diversity to the advertisement image.

In accordance with an embodiment of the present invention, there is provided an apparatus for displaying an advertisement image having a plurality of image elements, comprising:

a display panel for displaying the advertisement image thereon, the display panel including a plurality of clusters which are arranged in a pattern same as that of the advertisement image while being serially connected with one another, each of the clusters having at least one LED cell corresponding to one image element in the advertisement image, respectively, and a driving unit for driving the LED cell to represent the corresponding image element on the LED cell;

an image editor for performing an editing of the respective image elements in the advertisement image; and a control module connected between the image editor and the display panel to control the driving of the clusters.

In accordance with another embodiment of the present invention, there is provided an apparatus for displaying an advertisement image, wherein the advertisement image is partitioned into one or more sections, each section having a plurality of image elements, the apparatus comprising:

a display panel for displaying the advertisement image thereon, the display panel including a plurality of clusters which are arranged in a pattern same as that of each section of the advertisement image while being serially connected with one another and, wherein each of the clusters has at least one LED cell corresponding to one image element in each section of the advertisement image, respectively, and a driving unit for driving the LED cell to represent the corresponding image element on the LED cell;

an image editor for performing an editing of the respective image elements in the advertisement image; and one or more control modules connected sequentially with one another between the image editor and the display panel to control the driving of the clusters, wherein each control module is authorized to control a set of the clusters corresponding to the number of the image elements in each section.

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENTS

Hereinafter, embodiments of the present invention will be described in detail with reference to the accompanying drawings so that they can be readily implemented by those skilled in the art.

Figure 1:
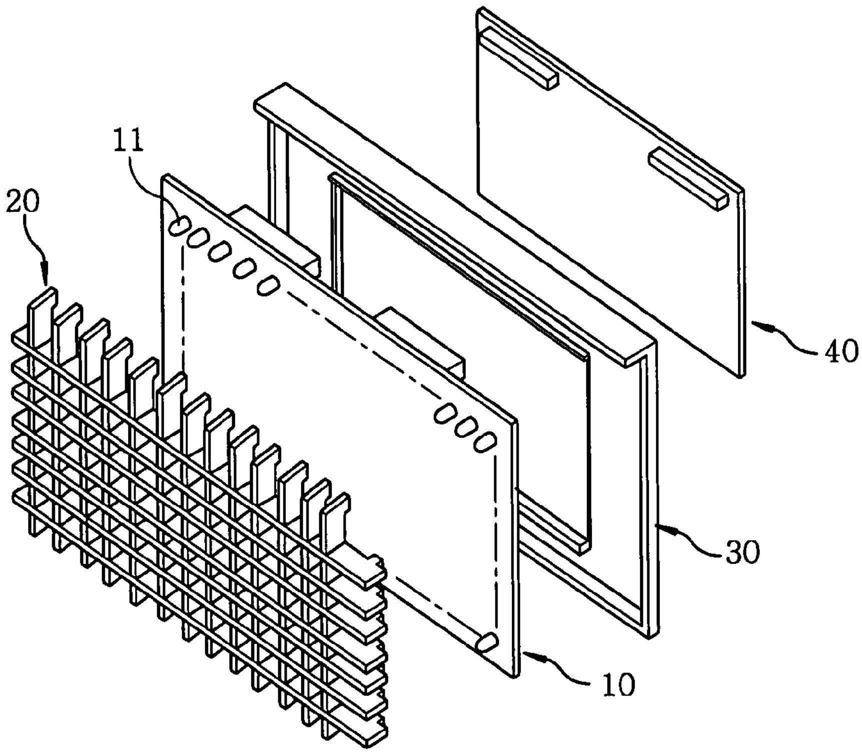
FIG. 1 (PRIOR ART)
FIG. 1 is an exploded oblique view showing a construction of a typical display apparatus used for advertisement.
Figure 2:
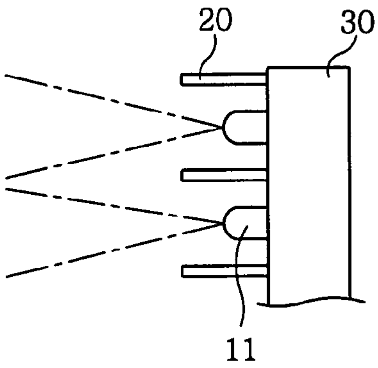
FIG. 2 (PRIOR ART)
FIG. 2 is a sectional view showing a directional angle of light for the LED cells shown in FIG. 1.
Figure 3:
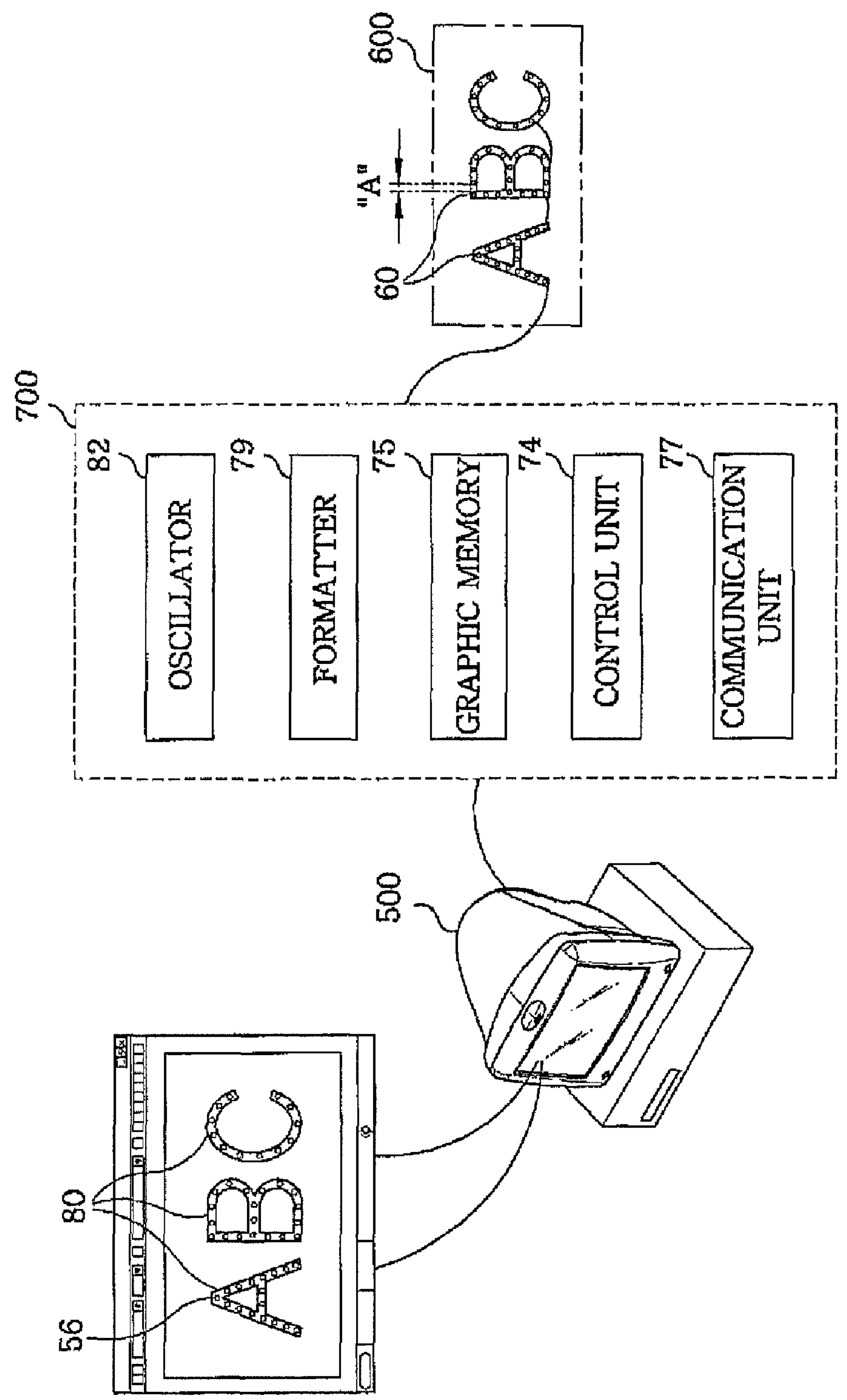
FIG. 3 is a schematic diagram of an apparatus for displaying an advertisement image in accordance with the present invention.

Referring to FIG. 3, there is shown a schematic diagram of an apparatus for displaying an advertisement image in accordance with the present invention. As shown in FIG. 3, the apparatus for displaying an advertisement image of the present invention includes an image editor 500, a display panel 600 and a control module 700.

The display panel 600 forms an advertisement screen and serves to display an advertisement image 80, the advertisement image 80 having a plurality of image elements which will be edited by the image editor 500. The display panel 600 includes a plurality of clusters 60 which are serially connected with one another.

Figure 4:
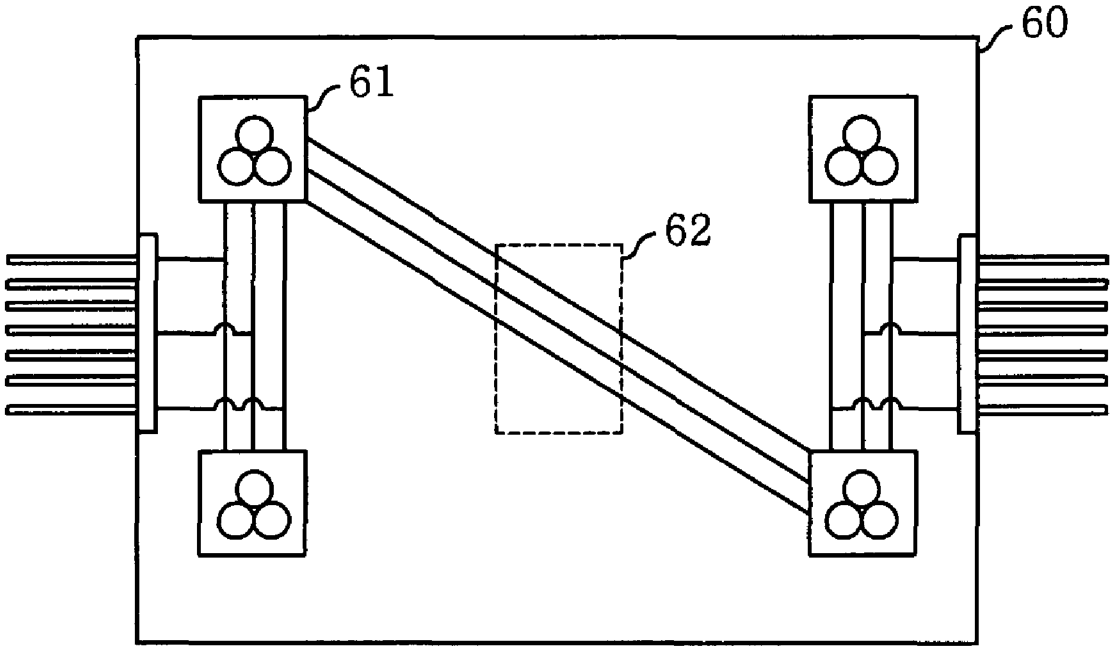
FIG. 4 is a detailed block diagram of the cluster shown in FIG. 3.

As shown in FIG. 4, each of the clusters 60 corresponds to each of the image elements in the advertisement image 80, respectively, and includes one or more LED cells 61 and a driving unit 62 which drives the LED cells 61 so as to display the advertisement image. Further, each LED cell 61 is consisted of a trio of R/G/B color LEDs.

On the display panel 600, the clusters 60 are arranged in the same pattern as the advertisement image 80. That is, on the display panel 600, the clusters 60 are serially connected to shape a pattern same as that of the advertisement image of, e.g., characters "ABC".

The LED cell 61 and the driving unit 62 are formed on a size of 45 mm×45 mm PCB to constitute a cluster 60. It is desirable to arrange the clusters 60 while having a space A of approximately 20 mm to 80 mm therebetween, 35 mm being the most desired, so as to prevent a blackening phenomenon therebetween. Further, it is desirable to arrange the LED cells 61 in each cluster 60 while having a space of approximately 20 mm to 60 mm, 30 mm being the most desired. Brightness of each LED 61 can be varied up to 36.5 to 100% by controlling a voltage level applied to each of the LED cells 61.

The driving unit 62 shown in FIG. 4 in each of the clusters 60 controls the driving of the LED cells 61 to display the image elements of the advertisement image 80 provided from the image editor 500 under the control of the control module 700.

The image editor 500 performs an editing, e.g., production, simulation, modification, and the like on the image elements in the advertisement image 80. Such an image editor 500 may be implemented with a multimedia production tool, for example, MACROMEDIA FLASH available from Macromedia Inc., U.S.A., being installed and operable on a personal computer or the like. The editing performed by the image editor 500 may permit to diversity the whole advertisement image and/or the individual image elements in the advertisement image in color, brightness and the like.

For example, in an upper left side of FIG. 3, there is illustrated an exemplary advertisement image produced by using the image editor 500. The advertisement image is illustrated as the characters of "ABC" having a plurality of image elements 56 to be displayed on the display panel 600. The image editor 500 changes a color and/or a brightness of the image elements 56 in the advertisement image 80 on an image element basis, to thereby accomplish the editing of the advertisement image 80.

By the editing performed on the image elements 56 by way of changing the color and/or the brightness of the image elements 56, it is possible to give an activity and diversity to the characters of the advertisement image 80.

The control module 700 connected between the image editor 500 and the display panel 600 controls the driving of the clusters 60 for each editing period, for example, 60 Hz, during which the advertisement image edited by the image editor 500 is changed in color and/or brightness. The control module 700 includes an oscillator 82, a formatter 79, a graphic memory 75, a communication unit 77 and a control unit 74.

The oscillator 82 generates a reference clock (CLK) signal, a latch-in enable signal (LE), and a latch-out enable signal (OE) in synchronization with the editing period of the advertisement image 80.

The formatter 79 converts each of the image elements 56 of the advertisement image 80 into RGB color data having gray levels adapted to drive the LED cells 61 in the clusters 60.

The graphic memory 75 temporarily stores the RGB data of the gray levels converted by the formatter 79 where each color of RGB has 8-bit data. The RGB data stored in the graphic memory 75 is sequentially provided to the display panel 600 on an image element basis.

The control unit 74 controls all the components of the control module 700 and generates a control signal for controlling the synchronization of the control module 700 and for allowing the RGB data of gray levels stored in the graphic memory to be sequentially provided to the clusters 60 on an image element basis in accordance with the clock signal CLK.

On the other hand, the above embodiment of the present invention has been described as a case in which one control module 700 performs the control of all the clusters 60, e.g., a predetermined 512-number of clusters, arranged in the display panel. If, however, the numbers of the clusters are increased due to a display panel having a large scale, it may be insufficient to employ only one control module 100 to control all clusters arranged in the display panel. Thus, in such a case, in accordance with the present invention, the advertisement image 80 may be partitioned into a plurality of sections, e.g., sections of the characters "A", "B", and "C", in which a predetermined number of image elements, e.g., 512 image elements are included, respectively, and an individual control module for each of the sections may be assigned to control a set of the 512 clusters in charge of the corresponding number of the 512 image elements included in each of the sections.

In this case, the control modules are sequentially connected with one another in a cascade fashion. In addition, one of the control modules serves as a master while the rest control modules operate as slaves. To accomplish the above configuration, each control module 700 further includes a communication unit 77 to communicate with that of a slave control module in a following stage in order to relay the control signal to a control unit in the slave control module in the following stage in synchronization with the editing period. The control unit of the slave control module in the following stage, in response to the control signal received from the communication unit in the former control module, provides the control signal to its corresponding clusters. And, the control signal will than be provided to its next order of a slave control module, thereby enabling all the clusters being controlled by the respective slave control modules to be synchronized with the clusters controlled by the master control module as a whole when displaying the image elements in the advertisement image 80. The communication unit may be implemented with a RS-232C serial interface.

Figure 5:
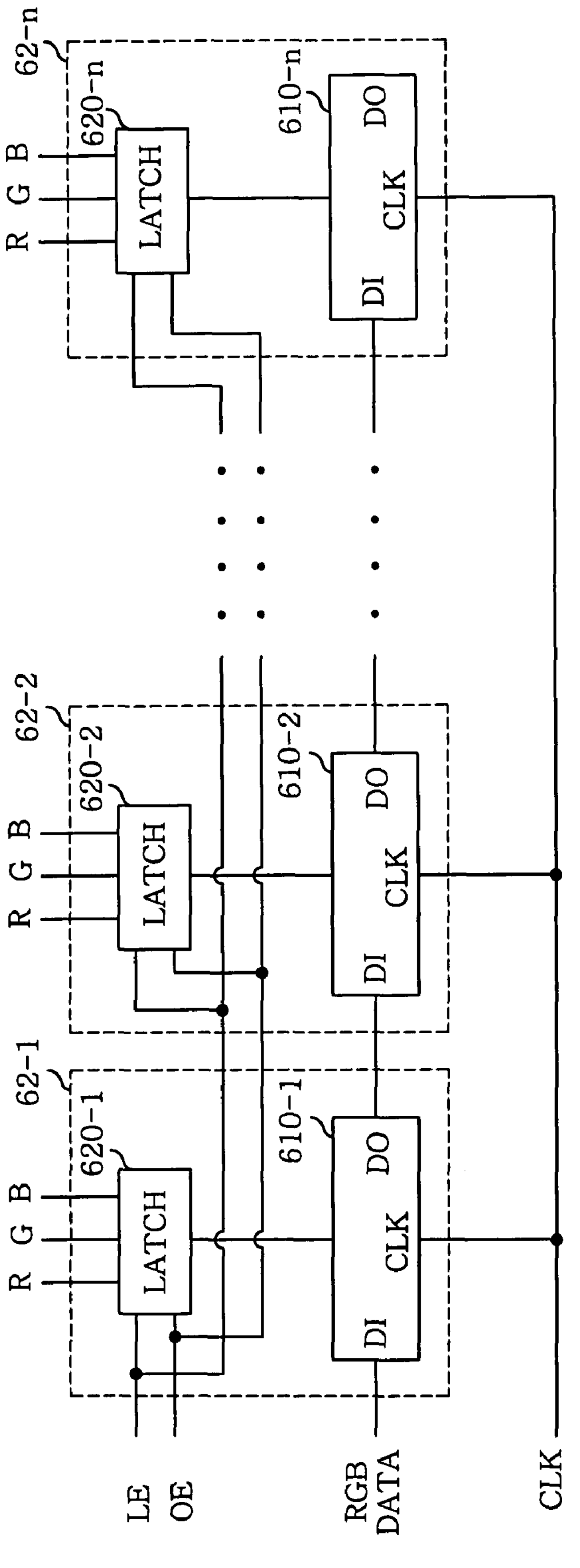
FIG. 5 is a detailed block diagram of driving units arranged in the display panel shown in FIG. 3.

FIG. 5 shows a schematic block diagram of driving units 62-1 to 62-n (here, e.g., n=512) included in the respective corresponding clusters 60 shown in FIG. 3. As shown in FIG. 5, the driving units 62-1 to 62-n are connected in series and include shift registers 610-1 to 620-n and latches 620-1 to 620-n, respectively.

Each of the shift registers 610-1 to 610-n has a data input terminal DI, a data output terminal DO and a clock input terminal CLK to which the clock signal CLK is applied. The shift registers 610-1 to 620-n are arranged in such a way that the data output terminal DO in a first shift register 610-1 is connected to the data input terminal DI in a second shift register 610-2; the data output terminal DO in the second shift register 610-2 is connected to a data input terminal DI in a third shift register 610-3; and so on. The latches 620-1 to 620-n are connected to their corresponding shift registers 610-1 to 620-n, respectively.

The RGB data is sequentially read out the graphic memory 75 on a basis of an image element and is then applied to the data input terminal DI in the shift register 610-1. The RGB data is then sequentially shifted to the second shift register 610-2, and, in turn, shifted to the third shift register 610-3, and so on in accordance with the clock signal (CLK). Subsequently, the whole RGB data corresponding to the advertisement image 80 are sequentially provided to the shift registers 610-1 to 610-n for an editing period of the advertisement image 80.

Each of the latches 620-1 to 620-n temporally latches therein a RGB data corresponding one image element provided from the corresponding shift resister 610-1 to 610-*n*, respectively. And the RGB data latched in each of the latches 620-1 to 620-n is transmitted to each LED cell 61 in each corresponding cluster 60 in accordance with the clock signal CLK. When the RGB data corresponding to the whole advertisement image are latched in the latches 620-1 to 620-n, the latches 620-1 to 620-n are disabled in accordance with the latch-out enable signal OE and are then updated with RGB data newly provided from the shift registers 610-1 to 610-n in accordance with the latch-in enable signal LE as described above.

Accordingly, when the advertisement image 80 is displayed on the display panel 600, it is displayed as if it is a moving picture due to the color and/or the brightness of the individually edited image elements in the advertisement image 80 for each editing period. If necessary, the editing for the advertisement image 80 may be performed on a basis of a predetermined number of image elements or the whole image elements instead of the individual image elements to give a variety of the advertisement image.

While the invention has been shown and described with respect to the embodiments, it will be understood by those skilled in the art that various changes and modifications may be made without departing from the scope of the invention as defined in the following claims.

What is claimed is:

1. An apparatus for displaying an advertisement image having a plurality of image elements, comprising:

a display panel for displaying the advertisement image thereon, the display panel including a plurality of clusters which are arranged in a pattern same as that of the advertisement image while being serially connected with one another, each of the clusters having at least one LED cell corresponding to one image element in the advertisement image, respectively, and a driving unit for driving each LED cell to represent the corresponding image element on the LED cell;

an image editor for performing an editing of the respective image elements in the advertisement image; and a control module connected between the image editor and the display panel to control the driving of the clusters, wherein the control module includes:

a formatter for converting each of the image elements into RGB data of gray levels;

a graphic memory for storing the RGB data of gray levels converted by the formatter; and a control unit for controlling the RGB data of gray levels stored in the graphic memory to be sequentially provided to the clusters, and wherein each of the driving units includes:

a shift register for receiving the RGB data from the graphic memory and shifting the RGB data to its neighboring shift register connected thereto in a following driving unit on a basis of an image element; and a latch for temporarily latching the RGB data from the shift register, the RGB data latched in the latch being transferred to the LED and being updated with RGB data newly provided from the shift register for each advertisement image edited by the image editor.

2. The apparatus of claim 1, wherein the editing performed by the image editor includes changing a color and/or a brightness of the image elements.

3. The apparatus of claim 1, wherein the LED cell includes a trio of color R/G/B LEDs.

4. An apparatus for displaying an advertisement image, wherein the advertisement image is partitioned into one or more sections, each section having a plurality of image elements, the apparatus comprising:

a display panel for displaying the advertisement image thereon, the display panel including a plurality of clusters which are arranged in a pattern same as that of each section of the advertisement image while being serially connected with one another and, wherein each of the clusters has at least one LED cell corresponding to one image element in each section of the advertisement image, respectively, and a driving unit for driving the LED cell to represent the corresponding image element on the LED cell;

an image editor for performing an editing of the respective image elements in the advertisement image; and a plurality of control modules connected sequentially with one another between the image editor and the display panel to control the driving of the clusters, wherein each of control modules is authorized to control a set of the clusters corresponding to the number of the image elements in each section, wherein each of the control modules includes:

a formatter for converting each of the image elements into RGB data of gray levels;

a graphic memory for storing the RGB data of gray levels converted by the formatter;

a control unit for generating a control signal to control the RGB data of gray levels stored in the graphic memory to be sequentially provided to the clusters on a basis of an image element; and a communication unit to communicate with that of a following control module to relay the control signal to the control unit of the following control module.

5. The apparatus of claim 4, wherein each of the driving units includes:

a shift register for receiving the RGB data from the graphic memory and shifting the RGB data to its neighboring shift register connected thereto in a following driving unit on a basis of an image element; and a latch for temporarily latching the RGB data from the shift register, the RGB data latched in the latch being transferred to the LED and being updated with RGB data newly provided from the shift register for each advertisement image edited by the image editor.

6. The apparatus of claim 4, wherein the editing performed by the image editor includes individually changing a color and/or a brightness of each of the image elements.

7. The apparatus of claim 4, wherein the LED cell includes a trio of color R/G/B LEDs.

* * * * *